(12) United States Patent
Yu

(10) Patent No.: US 9,780,446 B1
(45) Date of Patent: Oct. 3, 2017

(54) SELF-HEALING ANTENNA ARRAYS

(75) Inventor: Kai-Bor Yu, Costa Mesa, CA (US)

(73) Assignee: THE BOEING COMPANY, Chicago, IL (US)

(*) Notice: Subject to any disclaimer, the term of this patent is extended or adjusted under 35 U.S.C. 154(b) by 1745 days.

(21) Appl. No.: 13/279,602

(22) Filed: Oct. 24, 2011

(51) Int. Cl.
| | |
|---|---|
| *H01Q 3/00* | (2006.01) |
| *H01Q 3/22* | (2006.01) |
| *H04B 7/06* | (2006.01) |
| *H01Q 3/26* | (2006.01) |
| *G01S 7/28* | (2006.01) |

(52) U.S. Cl.
CPC ............ *H01Q 3/22* (2013.01); *H01Q 3/26* (2013.01); *H04B 7/0634* (2013.01); *G01S 7/2813* (2013.01); *H01Q 3/2605* (2013.01); *H04B 7/0617* (2013.01)

(58) Field of Classification Search
CPC .......... H01Q 3/22; H01Q 3/26; H01Q 3/2605; H01Q 3/2652; H01Q 3/34; H01Q 3/42; H04B 7/0617; H04B 7/0634; H04B 7/086; G01S 7/2813
USPC ................................ 342/371, 372, 377, 379
See application file for complete search history.

(56) References Cited

U.S. PATENT DOCUMENTS

| | | | | |
|---|---|---|---|---|
| 6,018,643 | A * | 1/2000 | Golemon et al. | 455/63.4 |
| 7,239,276 | B1 * | 7/2007 | Bonanni | 342/377 |
| 7,324,042 | B2 * | 1/2008 | Werntz | G01S 7/2813 342/159 |
| 7,928,906 | B2 * | 4/2011 | Leather et al. | 342/360 |
| 8,339,308 | B2 * | 12/2012 | Churan | 342/354 |
| 8,354,960 | B2 * | 1/2013 | Krich | H01Q 3/26 342/379 |
| 2001/0006374 | A1 * | 7/2001 | Erikmats et al. | 343/860 |
| 2008/0268775 | A1 * | 10/2008 | Bishop | H04B 7/0617 455/13.3 |
| 2009/0201206 | A1 * | 8/2009 | Li | G01S 7/282 342/373 |
| 2010/0117903 | A1 * | 5/2010 | Zheng | 342/373 |
| 2011/0025560 | A1 * | 2/2011 | Crozzoli | H01Q 3/26 342/373 |

(Continued)

OTHER PUBLICATIONS

"Design of self-healing arrays using vector-space projections"; Yongyi Yang; Stark, H. Antennas and Propagation, IEEE Transactions on Year: 2001, vol. 49, Issue: 4; pp. 526-534.*

(Continued)

*Primary Examiner* — Chuong P Nguyen
(74) *Attorney, Agent, or Firm* — Yee & Associates, P.C.

(57) ABSTRACT

A method and apparatus for managing an antenna. A current radiation pattern is identified for the antenna using initial coefficients for a modulation function for the antenna. A first constraint is applied to the current radiation pattern to form a modified radiation pattern. New coefficients for the modulation function are identified as coefficients for which a difference between a radiation pattern for the antenna generated using the coefficients and the modified radiation pattern is reduced. A second constraint is applied to a set of coefficients in the new coefficients to form modified coefficients for the modulation function. The steps of applying the first constraint, identifying the new coefficients for the modulation function, and applying the second constraint are iterated until a new radiation pattern based on the modified coefficients for the modulation function meets the first constraint.

19 Claims, 8 Drawing Sheets

(56) References Cited

U.S. PATENT DOCUMENTS

2011/0286372 A1* 11/2011 Taghavi Nasrabadi
............................ H04B 7/0851
370/310

OTHER PUBLICATIONS

"Low sidelobe antenna patterns with failed elements"; Krich, S.I.; Weiner, I.; Prust, C.J. Acoustics, Speech and Signal Processing (ICASSP), 2012 IEEE International Conference on Year: 2012; pp. 2581-2584.*

Mailloux, "Array Failure Correction with a Digitally Beamformed Array," IEEE Transactions on Antennas and Propagation, vol. 44, No. 12, Dec. 1996, pp. 1543-1550.

Peters, "A Conjugate Gradient-Based Algorithm to Minimize the Sidelobe Level of Planar Arrays with Element Failures," IEEE Transaction on Antennas and Propagation, vol. 39, No. 10, Oct. 1991, pp. 1497-1504.

Yang et al., "Design of Self-Healing Arrays Using Vector-Space Projections," IEEE Transaction on Antennas and Propagation, vol. 49, No. 4, Apr. 2001, pp. 526-534.

Yeo et al., "Array Failure Correction with a Genetic Algorithm," IEEE Transactions on Antennas and Propagation, vol. 47, No. 5, May 1999, pp. 823-828.

* cited by examiner

SELF-HEALING ANTENNA ARRAYS

BACKGROUND INFORMATION

1. Field

The present disclosure relates generally to antennas and, in particular, to managing the performance of antennas. Still more particularly, the present disclosure relates to a method and apparatus for managing side lobe levels for antennas.

2. Background

Typically, an antenna comprises one or more antenna elements electrically connected to at least one of a transmitter and a receiver. An antenna element is an electrical device that converts electrical signals into electromagnetic radiation and electromagnetic radiation into electrical signals. For example, an antenna may be configured to convert electrical signals received from a transmitter into electromagnetic radiation for transmission by the antenna. Further, an antenna may be configured to convert electromagnetic radiation received at the antenna into electrical signals to be sent to a receiver.

In some cases, the amplitudes and/or phases of the respective electrical signals being received at or sent from the different antenna elements in the antenna may be varied to change a radiation pattern of the antenna. The radiation pattern of an antenna describes the directional dependence of the strength of the electromagnetic radiation transmitted by the antenna or the sensitivity of the antenna to electromagnetic radiation received by the antenna.

Typically, the radiation pattern for an antenna may be represented by "lobes" and "nulls" at various angles with respect to the antenna. As used herein, the term "lobe" refers to angular directions at which the strength of the electromagnetic radiation transmitted reaches a maximum. As used herein, the term "null" refers to angular directions at which the strength of the electromagnetic radiation falls to substantially zero.

The phases of the electrical signals being received at or sent from the antenna elements in an antenna may be varied to electronically steer the antenna in a particular direction. Electronically steering an antenna also may be referred to as beamforming. When an antenna is electronically steered in a particular direction, the lobe at this particular direction, referred to as the "main lobe", is designed to be larger than the other lobes. The other lobes, referred to as "side lobes", represent undesired electromagnetic radiation being transmitted or received in undesired directions.

In some cases, one or more antenna elements in an antenna may operate outside of selected parameters. When these one or more antenna elements operate outside of selected parameters, the side lobe levels of the radiation pattern for the antenna may increase more than desired. A side lobe level (SLL) for a side lobe of the radiation pattern for an antenna is the ratio, in decibels (dB), of the amplitude at the peak of the main lobe to the amplitude at the peak of the side lobe.

Therefore, it would be advantageous to have a method and apparatus that takes into account at least some of the issues discussed above, as well as other possible issues.

SUMMARY

In one advantageous embodiment, a method for managing an antenna is provided. A current radiation pattern is identified for the antenna using initial coefficients for a modulation function for the antenna. A first constraint is applied to the current radiation pattern to form a modified radiation pattern. New coefficients for the modulation function are identified as coefficients for which a difference between a radiation pattern for the antenna generated using the coefficients and the modified radiation pattern is reduced. A second constraint is applied to a set of coefficients in the new coefficients to form modified coefficients for the modulation function. The steps of applying the first constraint, identifying the new coefficients for the modulation function, and applying the second constraint are iterated until a new radiation pattern based on the modified coefficients for the modulation function meets the first constraint.

In another advantageous embodiment, an apparatus comprises an antenna manager. The antenna manager is configured to identify a current radiation pattern for an antenna using initial coefficients for a modulation function for the antenna. The antenna manager is further configured to apply a first constraint to the current radiation pattern to form a modified radiation pattern. The antenna manager is further configured to identify new coefficients for the modulation function as coefficients for which a difference between a radiation pattern for the antenna generated using the coefficients and the modified radiation pattern is reduced. The antenna manager is further configured to apply a second constraint to a set of coefficients in the new coefficients to form modified coefficients for the modulation function. The antenna manager is further configured to iterate through the steps of applying the first constraint, identifying the new coefficients for the modulation function, and applying the second constraint until a new radiation pattern based on the modified coefficients for the modulation function meets the first constraint.

In yet another advantageous embodiment, a computer system comprises a bus system, a storage device connected to the bus system, and a processor unit. The storage device is configured to store program code. The processor unit is configured to run the program code to identify a current radiation pattern for an antenna using initial coefficients for a modulation function for the antenna. The processor unit is further configured to run the program code to apply a first constraint to the current radiation pattern to form a modified radiation pattern. The processor unit is further configured to run the program code to identify new coefficients for the modulation function as coefficients for which a difference between a radiation pattern for the antenna generated using the coefficients and the modified radiation pattern is reduced. The processor unit is further configured to run the program code to apply a second constraint to a set of coefficients in the new coefficients to form modified coefficients for the modulation function. The processor unit is further configured to run the program code to iterate through the steps of applying the first constraint, identifying the new coefficients for the modulation function, and applying the second constraint until a new radiation pattern based on the modified coefficients for the modulation function meets the first constraint.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

Figure 1:
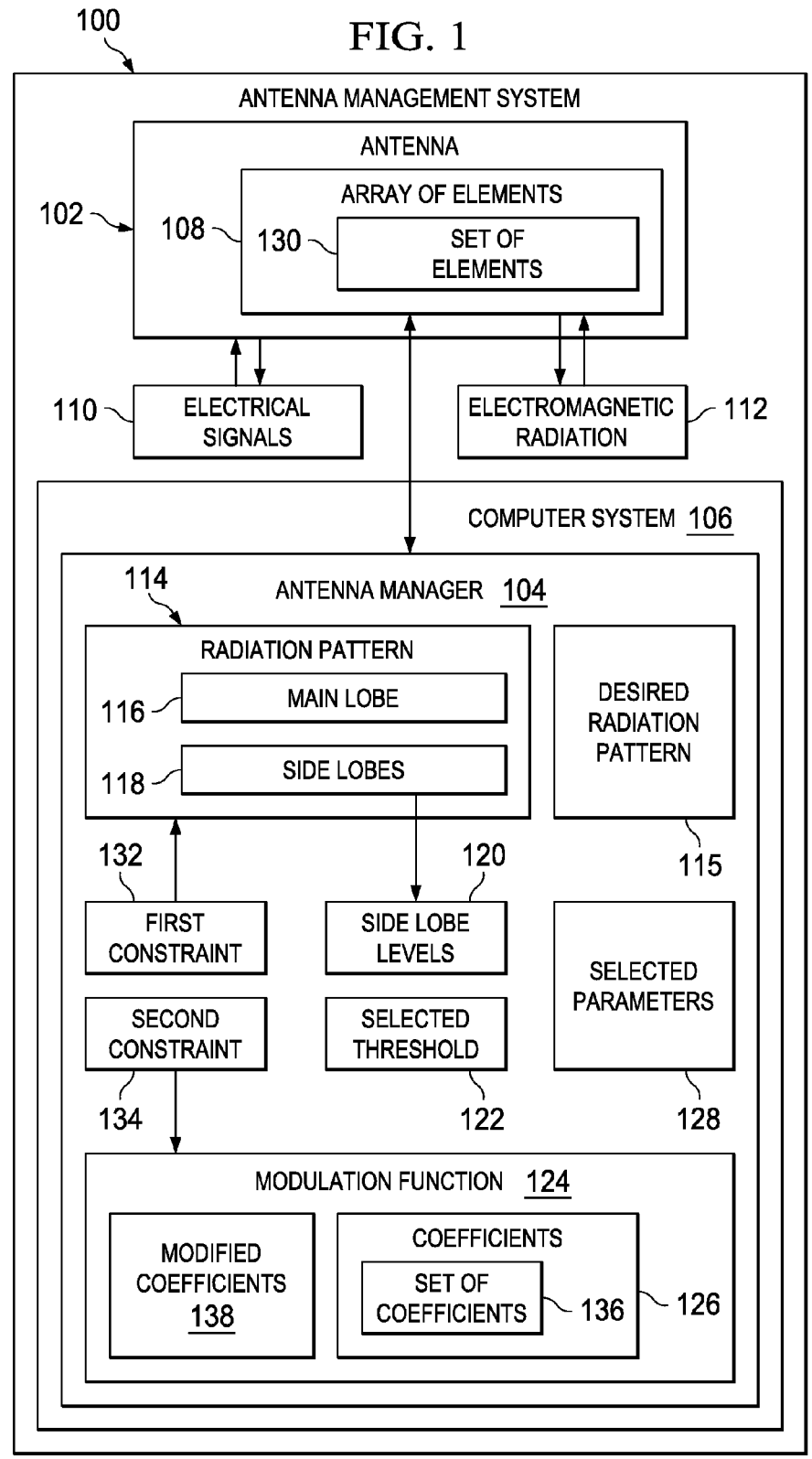
FIG. 1 is an illustration of an antenna management system in the form of a block diagram in accordance with an advantageous embodiment.

The different advantageous embodiments recognize and take into account different considerations. For example, the different advantageous embodiments recognize and take into account that the radiation pattern for an antenna depends on the amplitudes and/or phases selected for corresponding antenna elements in the antenna. In particular, these amplitudes and/or phases are selected for the electrical signals that are received by the corresponding antenna elements or sent from the corresponding antenna elements.

The amplitudes and/or phases selected for the different antenna elements in the antenna may be defined by a modulation function for the antenna. Typically, the modulation function has coefficients in which each coefficient defines an amplitude and/or phase for a particular antenna element in the antenna.

The different advantageous embodiments recognize and take into account that the modulation function selected for the antenna may produce a different radiation pattern when one or more antenna elements in the antenna operate outside of selected parameters as compared to when all of the antenna elements in the antenna are operating within selected parameters. In particular, the different advantageous embodiments recognize and take into account that a performance of the antenna may not be within selected tolerances. For example, the side lobe levels of the radiation pattern may increase more than desired when one or more antenna elements operate outside of selected parameters.

As a result, the amplitudes and/or phases for the antenna elements in the antenna still operating within selected parameters may need to be changed to produce the desired radiation pattern for the antenna. In other words, the amplitudes and/or phases for the different antenna elements may need to be changed to reduce the side lobe levels of the radiation pattern for the antenna to below some selected threshold.

Currently available methods for modifying the modulation function for the antenna that take into account the antenna elements operating outside of selected parameters may be more time-consuming and may require more effort and/or processing resources than desired. For example, some currently available methods for computing a new modulation function for the antenna require a computationally intensive non-linear optimization algorithm that may use more computations and take more time than desired.

With one currently available method for modifying the modulation function, a vector space projection (VSP) algorithm may be used. The different advantageous embodiments recognize and take into account that using a vector space projection algorithm may require more operations and iterations than desired to identify the modifications needed for the modulation function.

As one illustrative example, with this currently available method, the vector space projection algorithm may use a number of samples of the radiation pattern for the antenna and a sequence of computations to identify a solution that meets a number of constraints. However, the number of degrees of freedom used in this algorithm may be greater than the actual number of coefficients needed for the modulation function.

For example, this vector space projection algorithm may use Fourier transforms to identify a solution for the coefficients of the modulation function. The solution produced when using Fourier transforms generates values for a number of variables that equals the number of samples selected for the radiation pattern. In other words, the degrees of freedom may be equal to the number of samples.

For example, if 2,000 samples are selected for processing, the Fourier transform may generate a solution with values for 2,000 variables that meet the number of constraints. However, the antenna may only have 256 elements. In other words, the solution for the modulation function may only require 256 coefficients. With this currently available method, values for 256 variables out of the 2,000 variables are selected to form a final solution for the coefficients for the modulation function.

The different advantageous embodiments recognize and take into account that this final solution may be less accurate than desired. For example, with this currently available method, the solution with values for the 2,000 variables is spread out over more variables than desired. As a result, the solution may not be as accurate as desired. Further, the different advantageous embodiments recognize and take into account that selecting only a portion of these values may produce an undesired modulation function.

The different advantageous embodiments also recognize and take into account that using this vector space projection algorithm may be more time-consuming and computationally expensive than desired. For example, with 2,000 variables, the vector space projection algorithm may take longer to converge to a solution than desired.

Thus, the different advantageous embodiments provide a method and apparatus for managing an antenna. In particular, the different advantageous embodiments provide a method and apparatus for managing the side lobe levels of a radiation pattern for an antenna when one or more antenna elements in the antenna operate outside of selected parameters.

In one advantageous embodiment, a method for managing an antenna is provided. A current radiation pattern is identified for the antenna using initial coefficients for a modulation function for the antenna. A first constraint is applied to the current radiation pattern to form a modified radiation pattern. New coefficients for the modulation function are identified as coefficients for which a difference between a radiation pattern for the antenna generated using the coefficients and the modified radiation pattern is reduced. A second constraint is applied to a set of coefficients in the new coefficients to form modified coefficients for the modulation function. The steps of applying the first constraint, identifying the new coefficients for the modulation function, and applying the second constraint are iterated until a new radiation pattern based on the modified coefficients for the modulation function meets the first constraint.

Further, the steps of applying the first constraint to the current radiation pattern to form the modified radiation pattern, identifying the new coefficients for the modulation function using the modified radiation pattern, and applying the second constraint to the set of coefficients in the new coefficients for the modulation function to remove the contribution of the set of elements in the array of elements operating outside of the selected parameters to the modified radiation pattern to form the modified coefficients for the modulation function are iterated until a new radiation pattern based on the modified coefficients for the modulation function meets the first constraint.

With reference now to FIG. 1, an illustration of an antenna management system in the form of a block diagram is depicted in accordance with an advantageous embodiment. In these illustrative examples, the antenna management system 100 includes an antenna 102 and an antenna manager 104.

The antenna manager 104 may be implemented using hardware, software, or a combination of the two. In these illustrative examples, the antenna manager 104 may be implemented in a computer system 106. The computer system 106 may include a number of computers. As used herein, a "number of" items means one or more items. For example, a number of computers means one or more computers. When more than one computer is present in the computer system 106, these computers may be in communication with each other.

In these illustrative examples, the antenna manager 104 may be in communication with the antenna 102. In particular, the antenna manager 104 may be electrically connected to the antenna 102 in these depicted examples. As used herein, when a first component, such as the antenna manager 104, is electrically connected to a second component, such as the antenna 102, the first component is connected to the second component such that an electrical signal can be sent from the first component to the second component, the second component to the first component, or a combination of the two.

Further, the first component may be electrically connected to the second component without any additional components between the two components. The first component also may be electrically connected to the second component by one or more other components. For example, one electronic device may be electrically connected to a second electronic device without any additional electronic devices between the first electronic device and the second electronic device. In some cases, another electronic device may be present between the two electronic devices that are electrically connected to each other.

In other illustrative examples, the antenna manager 104 may be in a location remote to the antenna 102. As one illustrative example, the antenna manager 104 may be configured to communicate with the antenna 102 using wireless communications links, optical links, and/or some other suitable type of communications links.

As depicted, the antenna 102 includes an array of elements 108. The array of elements 108 may take the form of, for example, a one-dimensional array or a two-dimensional array. The elements in the array of elements 108 also may be referred to as antenna elements.

In these illustrative examples, the array of elements 108 may be configured to transmit or receive electromagnetic radiation 112. For example, the array of elements 108 may be configured to receive and convert electrical signals 110 into electromagnetic radiation 112 that is then transmitted. Further, the array of elements 108 may be configured to receive and convert electromagnetic radiation 112 into electrical signals 110.

The antenna manager 104 is configured to manage the antenna 102 such that a radiation pattern 114 produced by the antenna 102 has a desired radiation pattern 115. When the antenna 102 transmits electromagnetic radiation 112, the radiation pattern 114 of the antenna 102 describes the relative strength of the electromagnetic radiation 112 transmitted in the various directions with respect to the antenna 102. When the antenna 102 receives electromagnetic radiation 112, the radiation pattern 114 of the antenna 102 describes the relative sensitivity of the antenna 102 to electromagnetic radiation 112 received from the various directions with respect to the antenna 102.

The radiation pattern 114 produced when the antenna 102 is transmitting electromagnetic radiation 112 is substantially the same as the radiation pattern 114 produced when the antenna 102 is receiving electromagnetic radiation 112. The radiation pattern 114 for the antenna 102 also may be referred to as an antenna pattern and a far-field pattern.

The radiation pattern 114 for the antenna 102 may typically include a main lobe 116 and side lobes 118. The main lobe 116 is the largest lobe in the radiation pattern 114 and indicates a direction with respect to the antenna 102 in which the antenna 102 has been electronically steered. In particular, this direction may be an angular direction.

Electronically steering the antenna 102 in a particular direction includes changing the amplitudes and/or phases for the electrical signals 110 received or generated by the array of elements 108. For example, the amplitudes and/or phases applied to the electrical signals 110 received at the array of elements 108 may be varied such that the electromagnetic radiation 112 transmitted by the antenna 102 is strongest in a particular direction. Similarly, the amplitudes and/or phases for the electrical signals 110 generated by the array of elements 108 in response to receiving electromagnetic radiation 112 may be varied such that the array of elements 108 is most sensitive to electromagnetic radiation 112 received from a particular direction.

The side lobes 118 in the radiation pattern 114 represent undesired electromagnetic radiation being transmitted or received in undesired directions. When the radiation pattern 114 produced by the antenna 102 has the desired radiation pattern 115, side lobe levels 120 for the side lobes 118 are less than a selected threshold 122. In these illustrative examples, a side lobe level for a corresponding one of the side lobes 118 of the radiation pattern 114 for the antenna 102 is the ratio, in decibels (dB), of the amplitude at the peak of the main lobe 116 to the amplitude at the peak of the corresponding side lobe.

In these illustrative examples, the radiation pattern 114 produced by the antenna 102 depends on a modulation function 124 applied to the electrical signals 110 received or generated by the array of elements 108 in the antenna 102. The modulation function 124 is generated by the antenna manager 104. The antenna manager 104 generates the modulation function 124 such that the radiation pattern 114 for the antenna 102 has the desired radiation pattern 115.

The modulation function 124 identifies amplitudes, phases, or a combination of the two for the electrical signals 110 received or generated by the array of elements 108. The modulation function 124 also may be referred to as a weighting function or illumination function for the antenna 102. Further, the modulation function 124 may also be referred to as a beamforming function with steering and amplitude tapering capabilities.

In these illustrative examples, the modulation function 124 may take the form of a vector comprising coefficients 126. Each of the coefficients 126 may correspond to a corresponding electrical signal in the electrical signals 110 received or generated by a corresponding element in the array of elements 108. In this manner, each of the coefficients 126 may correspond to an element in the array of elements 108.

The coefficients 126 in the modulation function 124 may take the form of complex numbers. In one illustrative example, the modulation function 124 may be represented as follows:

$$w=[w(1), w(2), w(3) \ldots, w(l)], \quad (1)$$

where W is the modulation function 124 in the form of a vector, I is the total number of elements in the array of elements 108, and:

$$w(i) = a_i e^{j\theta_i}, \quad (2)$$

where w(i) is a coefficient for the $i^{th}$ element in the array of elements 108, $a_i$ is an amplitude for the $i^{th}$ element in the array of elements 108, e is the exponential function, j is $\sqrt{-1}$, and $\theta_i$ is a phase for the $i^{th}$ element in the array of elements 108.

When all of the elements in the array of elements 108 are operating within selected parameters 128, the antenna 102 performs as desired and produces the desired radiation pattern 115. In other words, when all of the elements in the array of elements 108 are operating within selected parameters 128, the side lobe levels 120 for the side lobes 118 in the radiation pattern 114 produced by the antenna 102 are less than the selected threshold 122.

However, when one or more of the elements in the array of elements 108 operate outside of selected parameters 128, the side lobe levels 120 may increase. In some cases, the side lobe levels 120 may increase beyond the selected threshold 122 when one or more of the elements in the array of elements 108 operate outside of the selected parameters 128. The elements that operate outside of the selected parameters 128 may be referred to as "failed elements".

The selected parameters 128 may include, for example, without limitation, a desired range of power for sending an electrical signal, a desired range of power for receiving an electrical signal, an operational parameter for a phase-shifter for the element, and/or other suitable types of parameters. In these illustrative examples, an element in the array of elements 108 may operate outside of the selected parameters 128 when the element is no longer capable of receiving or sending an electrical signal, is no longer capable of transmitting or receiving electromagnetic radiation, is no longer capable of converting electromagnetic radiation into an electrical signal or an electrical signal into electromagnetic radiation, or a combination of one or more of the above.

The antenna manager 104 is configured to monitor the performance of the array of elements 108 and can identify when one or more elements are not operating within the selected parameters 128. As one illustrative example, the antenna manager 104 may monitor the radiation pattern 114 for the antenna 102 and determine when one or more of the side lobe levels 120 for the side lobes 118 are greater than the selected threshold 122.

As one illustrative example, a set of elements 130 in the array of elements 108 may stop operating within the selected parameters 128. In other words, the set of elements 130 may "fail". In response to identifying the set of elements 130 that are operating outside of the selected parameters 128, the antenna manager 104 may change the modulation function 124 to modify the radiation pattern 114 produced by the antenna 102.

In particular, the antenna manager 104 identifies a first constraint 132 for the radiation pattern 114 and a second constraint 134 for the modulation function 124. In these illustrative examples, the first constraint 132 is based on the selected threshold 122 for the side lobe levels 120 of the side lobes 118. The first constraint 132 for the radiation pattern 114 is that all of the side lobes 118 have side lobe levels 120 less than the selected threshold 122.

The second constraint 134 is that a set of coefficients 136 in the modulation function 124 corresponding to the set of elements 130 operating outside of the selected parameters 128 be set to zero. In this manner, the contributions of the set of elements 130 to the radiation pattern 114 for the antenna 102 may be removed when the antenna manager 104 is identifying modified coefficients 138 for the modulation function 124 for the antenna 102.

The radiation pattern 114 produced by the antenna 102 when the modulation function 124 with the modified coefficients 138 is applied to the electrical signals 110 received or generated by the array of elements 108 may meet the first constraint 132. In other words, the radiation pattern 114 produced based on the modified coefficients 138 for the modulation function 124 may have the desired radiation pattern 115.

The illustration of the antenna management system 100 in FIG. 1 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in some illustrative example, the antenna manager 104 may be configured to take into account constraints in addition to the first constraint 132 and the second constraint 134. For example, the antenna manager 104 may take into account nulls in the radiation pattern 114. Nulls may be angular directions with respect to the antenna 102 at which the electromagnetic radiation 112 may not be received and/or transmitted.

Figure 2:
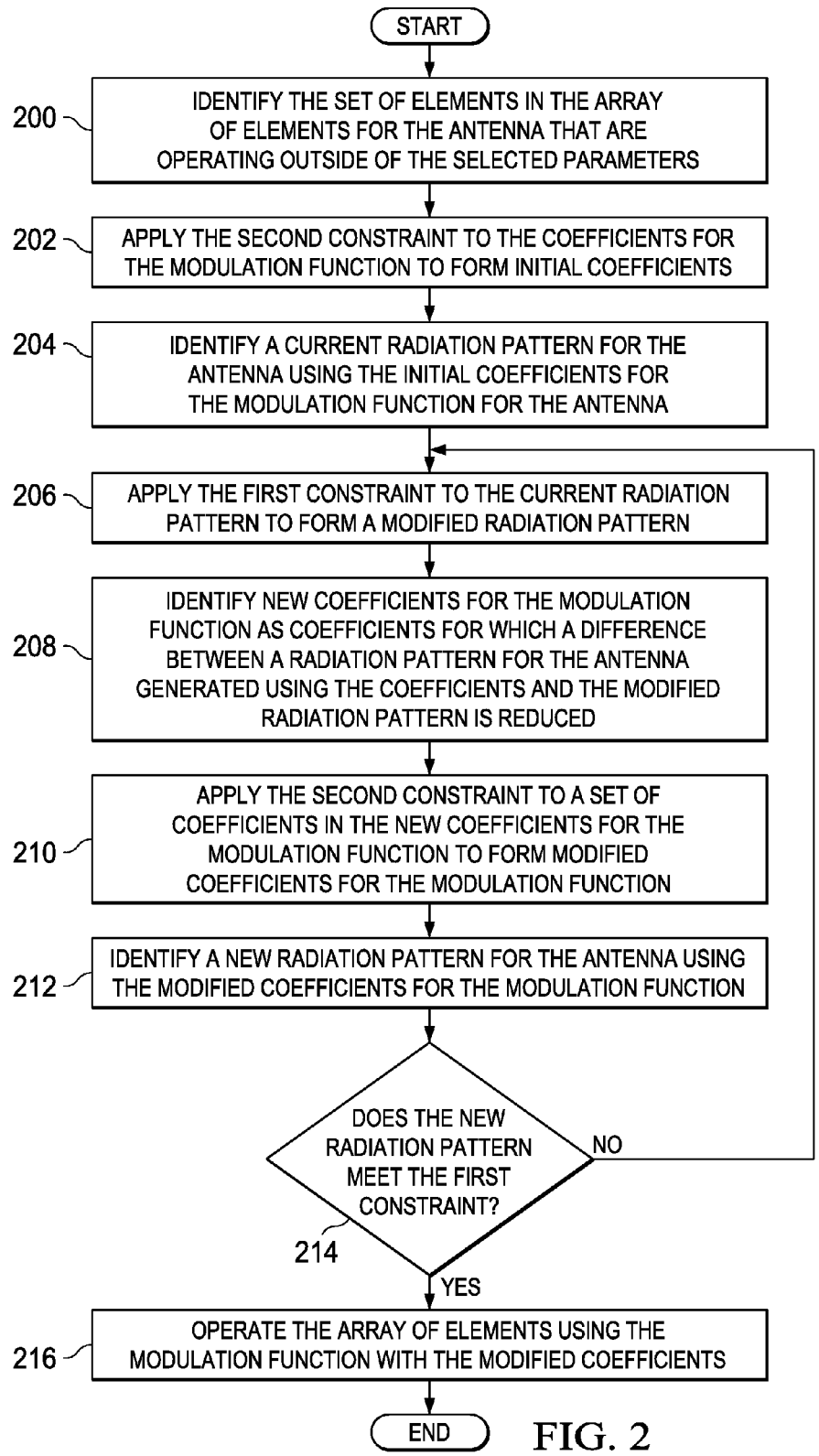
FIG. 2 is an illustration of a process for managing side lobe levels for an antenna in the form of a flowchart in accordance with an advantageous embodiment.

With reference now to FIG. 2, an illustration of a process for managing side lobe levels for an antenna in the form of a flowchart is depicted in accordance with an advantageous embodiment. The process illustrated in FIG. 2 may be implemented using the antenna manager 104 in FIG. 1.

The process begins by identifying the set of elements 130 in the array of elements 108 for the antenna 102 that are operating outside of selected parameters 128 (operation 200). The process then applies the second constraint 134 to the coefficients 126 for the modulation function 124 to form initial coefficients (operation 202).

In operation 202, applying the second constraint 134 to the coefficients 126 sets the set of coefficients 136 corresponding to the set of elements 130 operating outside of the selected parameters 128 to substantially zero. The initial coefficients correspond to the elements in the array of elements 108 for the antenna 102. In particular, each of the initial coefficients corresponds to a corresponding element in the array of elements 108.

Thereafter, the process identifies a current radiation pattern for the antenna 102 using the initial coefficients for the modulation function 124 for the antenna 102 (operation 204). In operation 204, the current radiation pattern is the radiation pattern 114 produced by the antenna 102 when the set of elements 130 is operating outside of the selected parameters 128 based on the current modulation function 124.

In these illustrative examples, the radiation pattern 114 may be defined as a product of a matrix and the modulation function 124. The matrix identifies the contributions of each of the elements in the array of elements 108 to the radiation pattern 114 for a selected number of samples of the radiation pattern 114. The selected number of samples may be, for example, 1,000 samples, 2,000 samples, 2,500 samples, 3,000 samples, or some other number of samples.

The current radiation pattern is expressed as follows:

$$g = Ew \tag{3}$$

$$E(m, n) = \exp\left(j\frac{2\pi}{\lambda}u(m)x(n)\right) \tag{4}$$

where g is the current radiation pattern, E is a matrix identifying the contributions of each of the elements in the array of elements 108 to the current radiation pattern, w is the modulation function 124 in the form of a vector, j is $$\sqrt{-1},$$

λ is wavelength, n is pi, u(m) is sin(θ(m)) in which θ(m) is the m-th angle, and x(n) is the location of the n-th antenna element.

Next, the process applies the first constraint 132 to the current radiation pattern to form a modified radiation pattern (operation 206). In operation 206, applying the first constraint 132 includes setting any value for the peaks of the side lobes 118 in the samples of the current radiation pattern that are greater than the selected threshold 122 to the selected threshold 122.

The process then identifies new coefficients for the modulation function 124 as coefficients for which a difference between a radiation pattern for the antenna 102 generated using the coefficients and the modified radiation pattern is reduced (operation 208). In operation 208, a third constraint may be applied to the new coefficients. In one illustrative example, the third constraint may be applied to the new coefficients such that the new coefficients have a selected number of coefficients. This selected number of coefficients may be, for example, the same number as a number of elements in the array of elements. For example, if the array of elements has 256 elements, the third constraint is applied such that the new coefficients include 256 coefficients.

In operation 208, identifying the new coefficients includes first identifying trial coefficients for the modulation function 124. The trial coefficients have the same number of coefficients as the selected number of coefficients. In particular, in operation 208, the trial coefficients may be identified using a first product of a transpose of a complex conjugate of the matrix and the modified radiation pattern divided by a second product of the transpose of the complex conjugate of the matrix and the matrix.

Further, in operation 208, the step of identifying the trial coefficients may be iterated through using a least squares algorithm until the radiation pattern for the antenna generated using the trial coefficients and the modified radiation pattern is reduced to a minimum. The least squares algorithm may be, for example, a minimum-norm least squares algorithm.

In particular, in operation 208, the new coefficients may be identified as the trial coefficients for which a sum of differences between first values for the radiation pattern 114 generated using the trial coefficients at a plurality of angular directions with respect to the antenna 102 and second values for the modified radiation pattern at the plurality of angular directions is reduced to a minimum value for the sum of the differences.

For example, the trial coefficients may be identified as follows:

$$\hat{w} = (E^H E)^{-1} E^H \hat{g} \tag{5}$$

where $\hat{w}$ is the modulation function 124 with the trial coefficients, $E^H$ is a transpose of the complex conjugate for E, and $\hat{g}$ is the modified radiation pattern.

Thereafter, the process applies the second constraint 134 to a set of coefficients 136 in the new coefficients for the modulation function 124 to form modified coefficients 138 for the modulation function 124 (operation 210). This set of coefficients 136 corresponds to the set of elements 130 operating outside of the selected parameters 128. In this manner, in operation 210, a contribution of the set of elements 130 to the modified radiation pattern is substantially removed to form the modified coefficients 138 for the modulation function 124. In particular, applying the second constraint 134 to the set of coefficients 136 corresponding to the set of elements 130 sets the set of coefficients 136 to zero.

The process then identifies a new radiation pattern for the antenna 102 using the modified coefficients for the modulation function 124 (operation 212). The process then determines whether the new radiation pattern meets the first constraint 132 (operation 214). In other words, in operation 214, the process determines whether the new radiation pattern has the desired radiation pattern 115 in which the side lobe levels 120 for the side lobes 118 of the radiation pattern are below the selected threshold 122.

If the new radiation pattern meets the first constraint 132, the process operates the array of elements 108 using the modulation function 124 with the modified coefficients 138 (operation 216), with the process terminating thereafter. Otherwise, the process returns to operation 206, with the new radiation pattern being the current radiation pattern. In this manner, the process iterates until a new radiation pattern based on the modified coefficients 138 for the modulation function 124 meets the first constraint 132.

In operation 216, the process operates the antenna 102 using the modulation function 124 with the modified coefficients 138 such that a performance of the antenna 102 is within selected tolerances. In particular, when the antenna 102 is operated using the modulation function 124 with the modified coefficients 138, the antenna 102 may produce a radiation pattern 114 having side lobes 118 with the side lobe levels 120 that are within selected tolerances. In other words, the side lobe levels 120 may be substantially equal to or less than some selected threshold.

The flowchart and block diagrams in the different depicted embodiments illustrate the architecture, functionality, and operation of some possible implementations of apparatuses and methods in an advantageous embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 3:
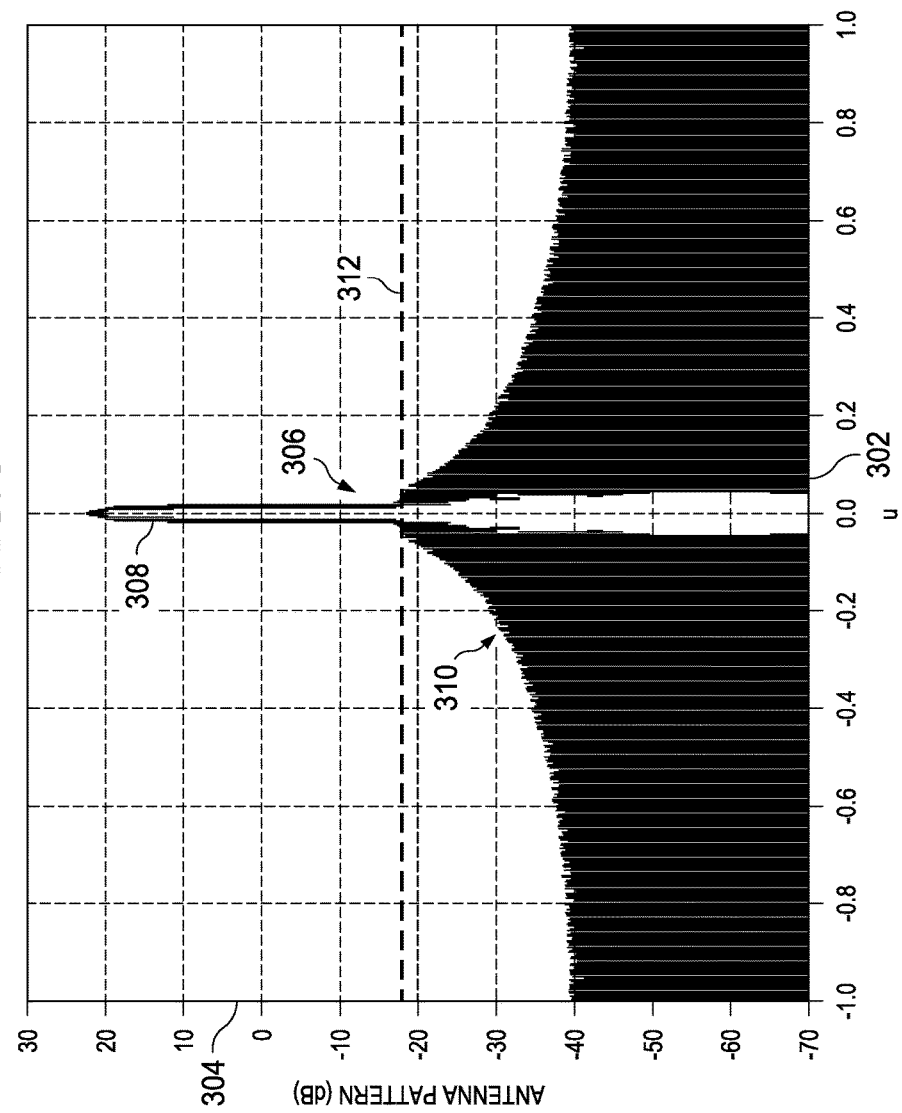
FIG. 3 is an illustration of a graph of the radiation pattern for an antenna in accordance with an advantageous embodiment.

With reference now to FIG. 3, an illustration of a graph of the radiation pattern for an antenna is depicted in accordance with an advantageous embodiment. In this illustrative example, the graph 300 has a horizontal axis 302 and a vertical axis 304. The horizontal axis 302 is u, which is an angular direction. In particular, u may be sin(θ), in which θ is the angle. The vertical axis 304 is amplitude of side lobe levels in decibels.

As depicted, an initial radiation pattern 306 for an antenna, such as the antenna 102 in FIG. 1, is plotted in the graph 300. In this illustrative example, the initial radiation pattern 306 is produced by the antenna when all of the elements in the array of elements for the antenna are operating within selected parameters. The initial radiation pattern 306 has a main lobe 308 and side lobes 310.

Additionally, a selected threshold 312 for side lobe levels for the radiation pattern for the antenna is present in the graph 300. This selected threshold 312 is an example of one implementation for the selected threshold 122 in FIG. 1. As depicted, all of the side lobe levels for the side lobes 310 of the initial radiation pattern 306 are below the selected threshold 312.

Figure 4:
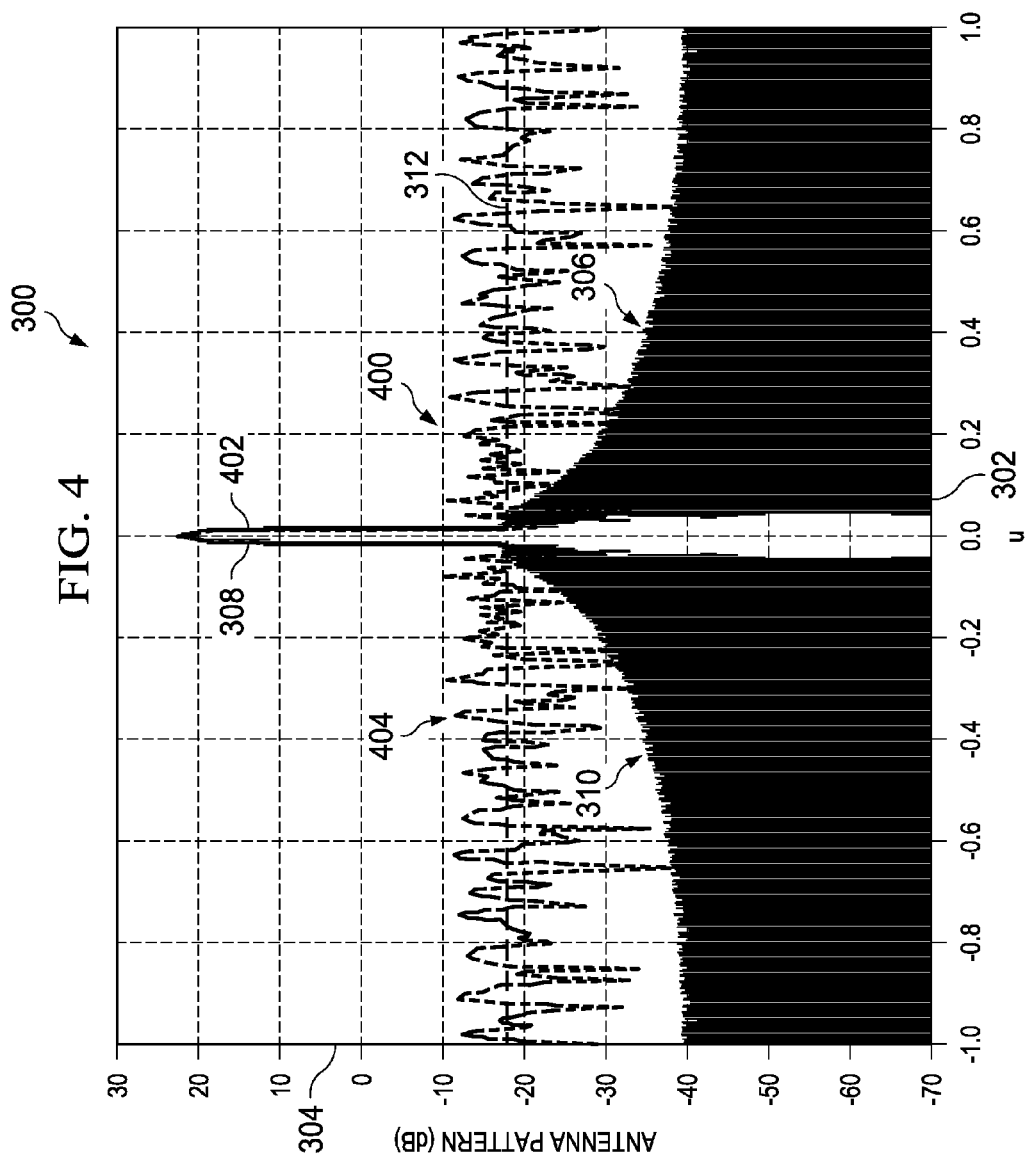
FIG. 4 is an illustration of a graph of the radiation pattern for an antenna in accordance with an advantageous embodiment.

With reference now to FIG. 4, an illustration of a graph of the radiation pattern for an antenna is depicted in accordance with an advantageous embodiment. In this illustrative example, a current radiation pattern 400 has been plotted in the graph 300 from FIG. 3. The current radiation pattern 400 is for a current condition of the antenna in which a set of elements in the array of elements for the antenna is operating outside of the selected parameters.

In this illustrative example, the current radiation pattern 400 is an example of the current radiation pattern identified in operation 204 in FIG. 2. The current radiation pattern 400 has a main lobe 402 and side lobes 404. As depicted, the side lobe levels for the side lobes 404 are above the selected threshold 312.

Figure 5:
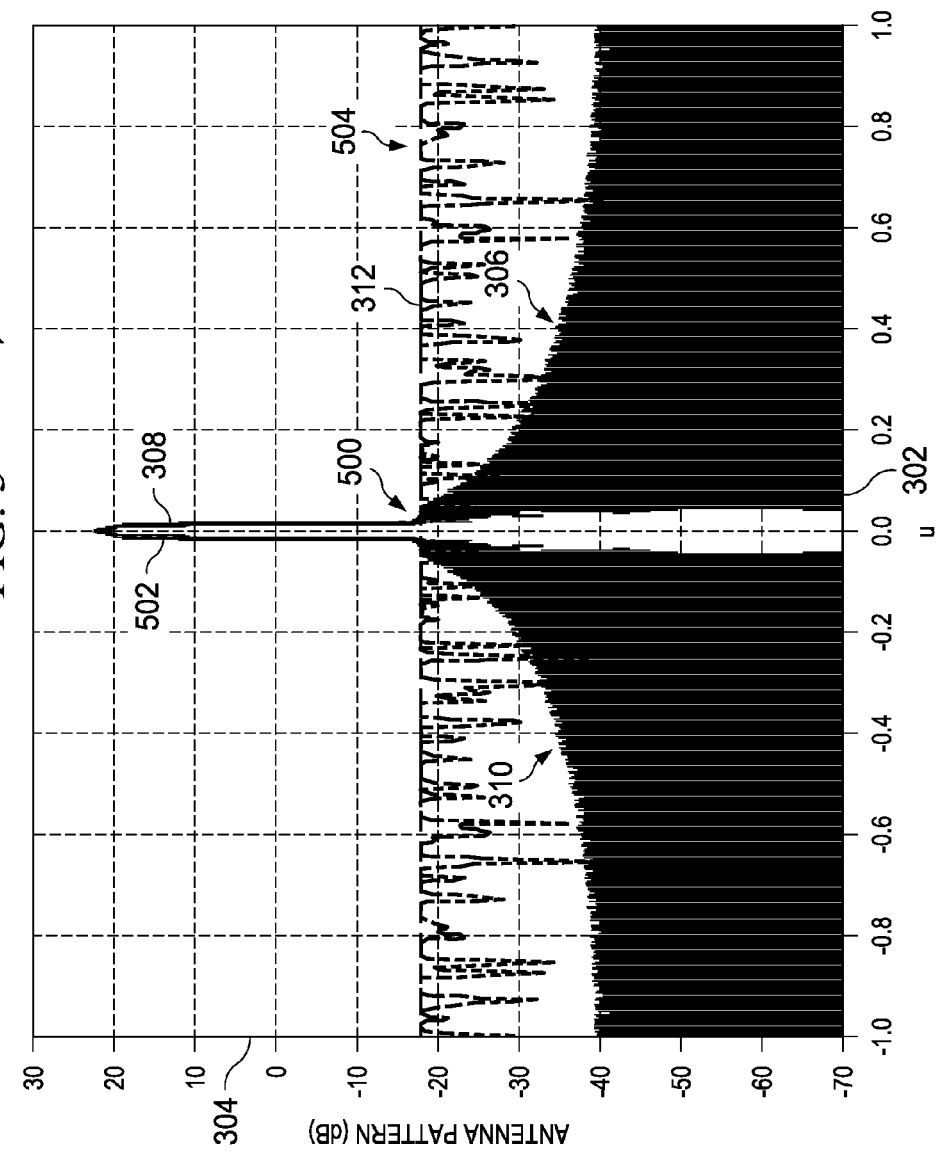
FIG. 5 is an illustration of a graph of the radiation pattern for an antenna in accordance with an advantageous embodiment.

Turning now to FIG. 5, an illustration of a graph of the radiation pattern for an antenna is depicted in accordance with an advantageous embodiment. In this illustrative example, a modified radiation pattern 500 has been plotted in the graph 300 from FIG. 3. The modified radiation pattern 500 is an example of one implementation for the modified radiation pattern formed in operation 206 in FIG. 2.

The modified radiation pattern 500 has a main lobe 502 and side lobes 504. In this illustrative example, the side lobe levels for the side lobes 404 of the current radiation pattern 400 in FIG. 4 having peak amplitudes greater than the selected threshold 312 have been set to the selected threshold 312 to form the side lobes 504 for the modified radiation pattern 500. As depicted, the side lobe levels for the side lobes 504 of the modified radiation pattern 500 are substantially equal to or below the selected threshold 312.

An antenna manager for the antenna, such as the antenna manager 104 in FIG. 1, may use the modified radiation pattern 500 to generate new coefficients for a modulation function for the antenna. Further, the antenna manager may use the process illustrated in FIG. 2 to iteratively identify the modified radiation pattern that meets the first constraint 132 in FIG. 1 and the coefficients for the modulation function that meet the second constraint 134 in FIG. 1. In this manner, the antenna manager may identify the modified coefficients for the modulation function that meet the second constraint 134 in FIG. 1 and cause the radiation pattern for the antenna to meet the first constraint 132 in FIG. 1.

Figure 6:
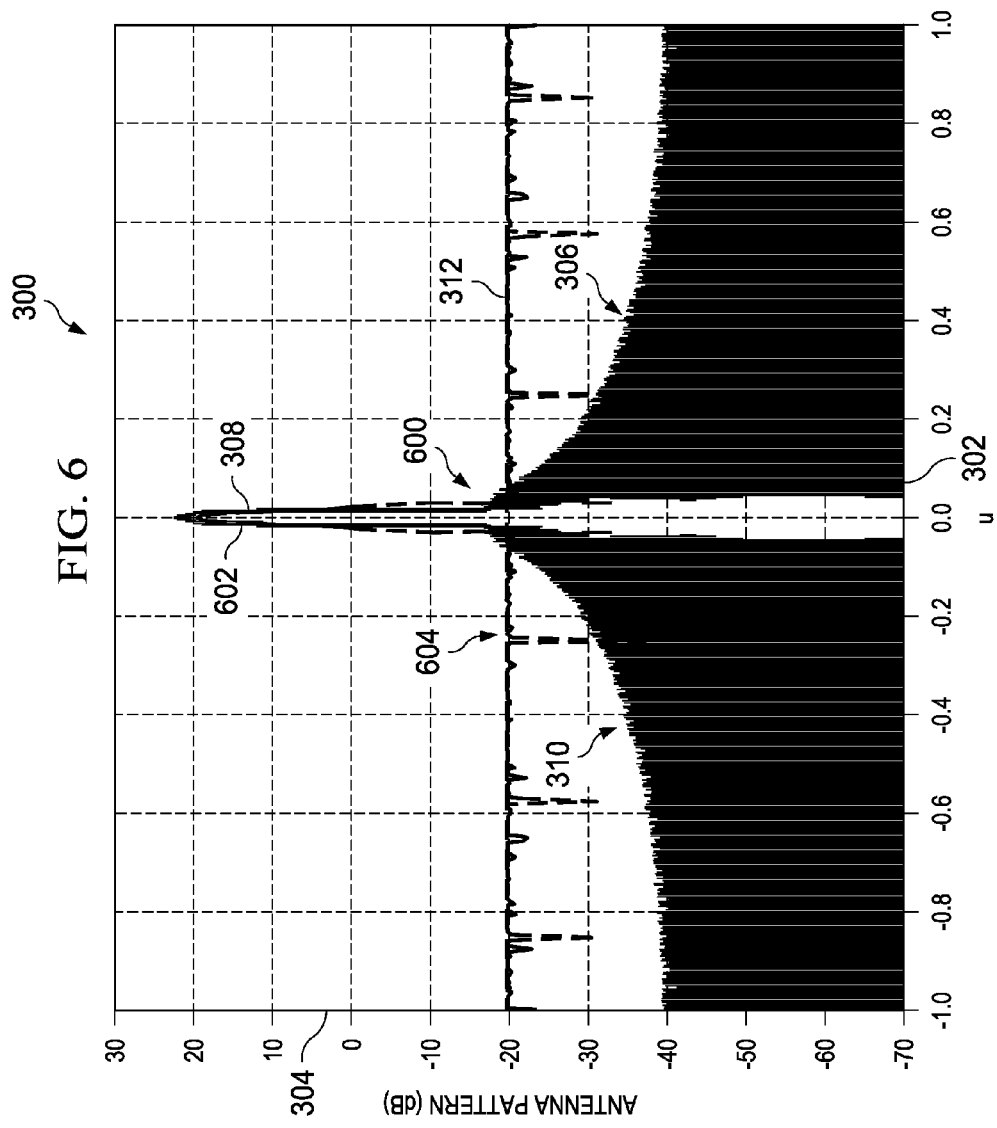
FIG. 6 is an illustration of a graph of the radiation pattern for an antenna in accordance with an advantageous embodiment.

With reference now to FIG. 6, an illustration of a graph of the radiation pattern for an antenna is depicted in accordance with an advantageous embodiment. In this illustrative example, a desired radiation pattern 600 has been plotted in the graph 300 from FIG. 3. The desired radiation pattern 600 has a main lobe 602 and side lobes 604. The side lobes 604 have side lobe levels that are below the selected threshold 312. The desired radiation pattern 600 may be identified based on modified coefficients for a modulation function for the antenna identified using the process illustrated in FIG. 2.

Figure 7:
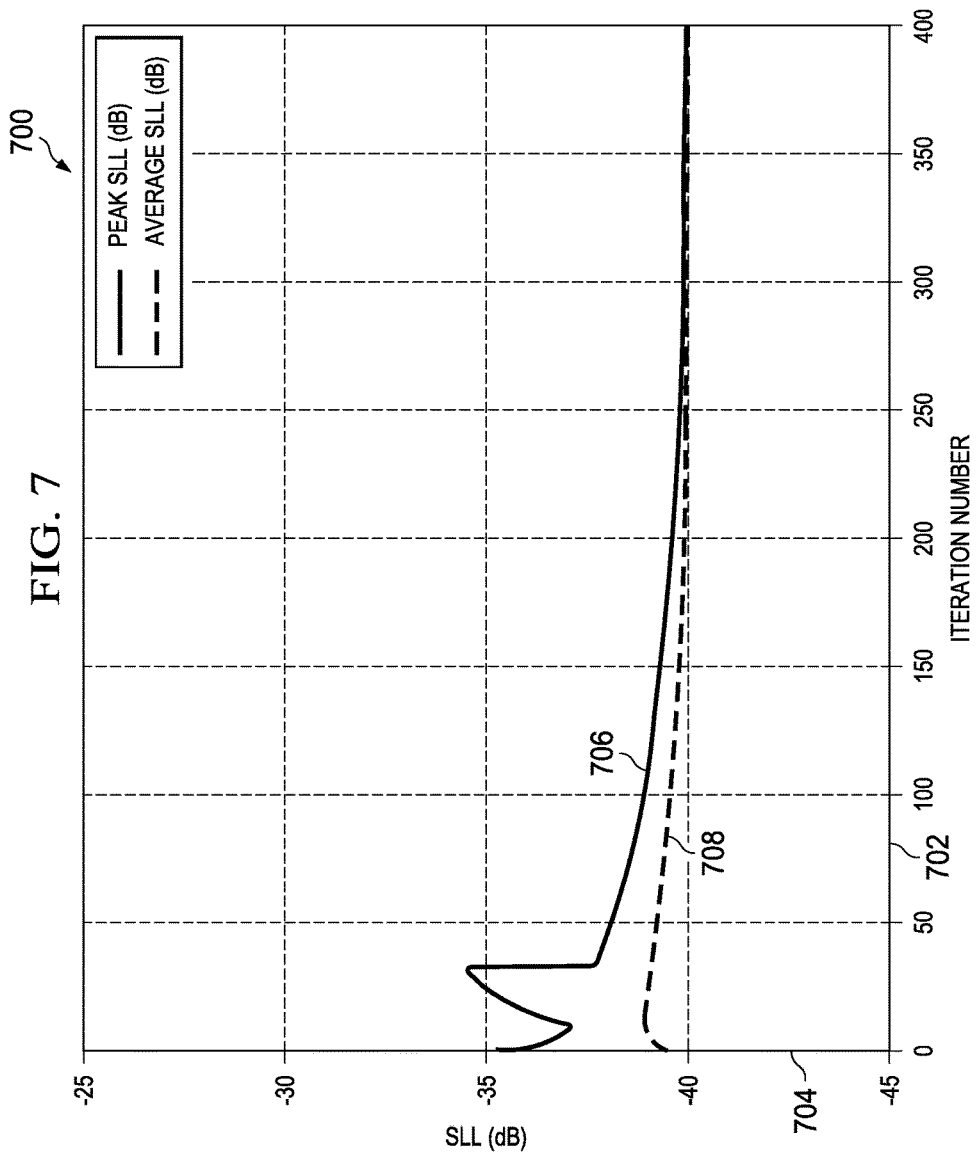
FIG. 7 is an illustration of a graph of peak side lobe levels and average side lobe levels in accordance with an advantageous embodiment.

Turning now to FIG. 7, an illustration of a graph of peak side lobe levels and average side lobe levels is depicted in accordance with an advantageous embodiment. In this illustrative example, the graph 700 has a horizontal axis 702 and a vertical axis 704. The horizontal axis 702 is a number of iterations for the process described in FIG. 2. The vertical axis 704 is side lobe level in decibels.

A peak side lobe level 706 and an average side lobe level 708 are plotted in the graph 700. The peak side lobe level 706 is for the peak of the first side lobe on either side of the main lobe in the radiation pattern for an antenna. The average side lobe level 708 is an average side lobe level for all of the other side lobes in the radiation pattern for the antenna. As depicted, when the number of iterations is greater than about 250 iterations, the peak side lobe levels 706 and the average side lobe level 708 converge.

Figure 8:
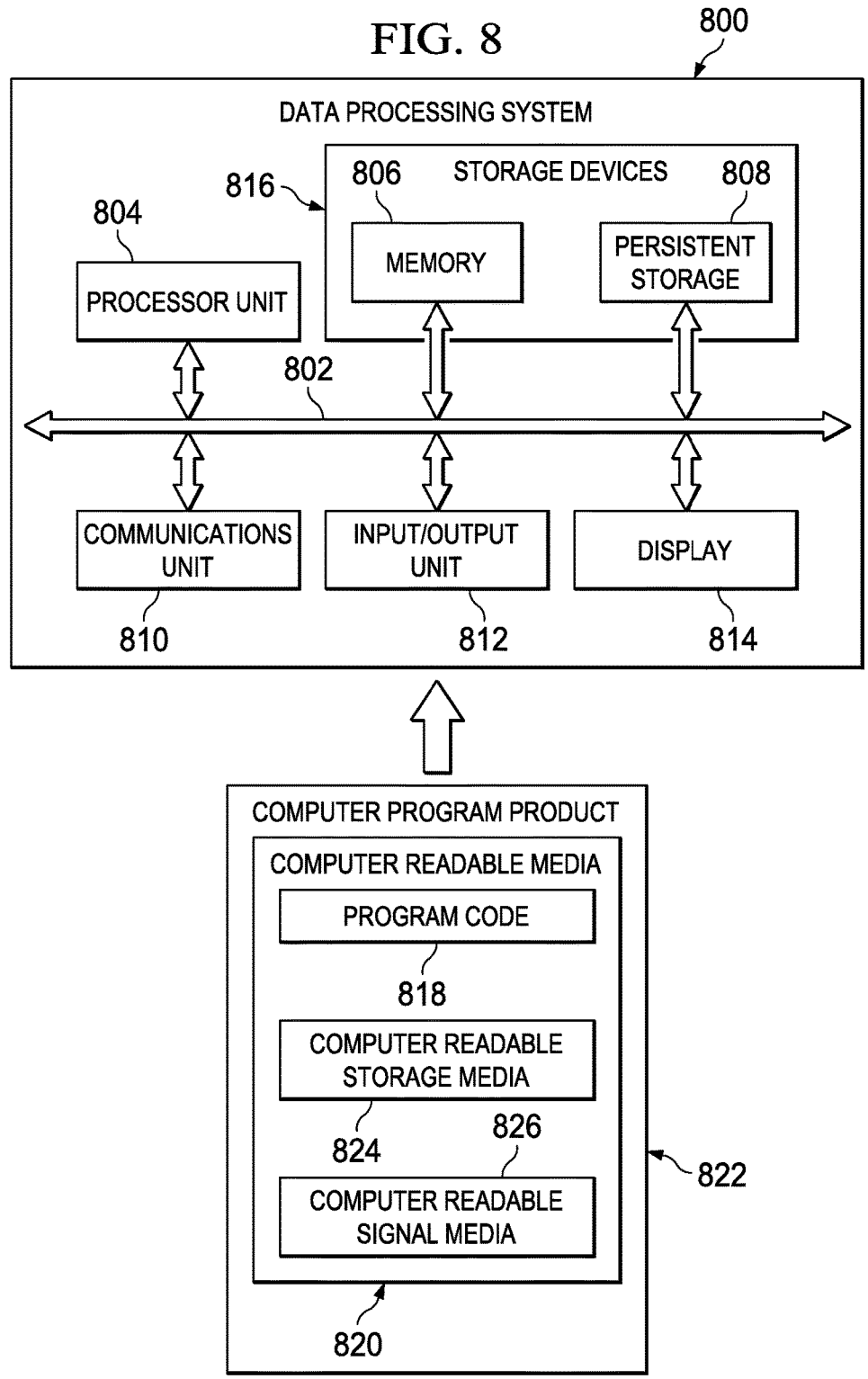
FIG. 8 is an illustration of a data processing system in accordance with an advantageous embodiment.

Turning now to FIG. 8, an illustration of a data processing system is depicted in accordance with an advantageous embodiment. A data processing system 800 may be used to implement one or more computers in the computer system 106 in FIG. 1 in these depicted examples. In this illustrative example, the data processing system 800 includes a communications framework 802, which provides communications between a processor unit 804, a memory 806, persistent storage 808, a communications unit 810, an input/output (I/O) unit 812, and a display 814.

The processor unit 804 serves to execute instructions for software that may be loaded into the memory 806. The processor unit 804 may be a number of processors, a multi-processor core, or some other type of processor, depending on the particular implementation. A number, as used herein with reference to an item, means one or more items. Further, the processor unit 804 may be implemented using a number of heterogeneous processor systems in which a main processor is present with secondary processors on a single chip. As another illustrative example, the processor unit 804 may be a symmetric multi-processor system containing multiple processors of the same type.

The memory 806 and the persistent storage 808 are examples of storage devices 816. A storage device is any piece of hardware that is capable of storing information, such as, for example, without limitation, data, program code in functional form, and/or other suitable information either on a temporary basis and/or a permanent basis. The storage devices 816 also may be referred to as computer readable storage devices in these examples. The memory 806, in these examples, may be, for example, a random access memory or any other suitable volatile or non-volatile storage device. The persistent storage 808 may take various forms, depending on the particular implementation.

For example, the persistent storage 808 may contain one or more components or devices. For example, the persistent storage 808 may be a hard drive, a flash memory, a rewritable optical disk, a rewritable magnetic tape, or some combination of the above. The media used by the persistent storage 808 also may be removable. For example, a removable hard drive may be used for the persistent storage 808.

The communications unit 810, in these examples, provides for communications with other data processing systems or devices. In these examples, the communications unit 810 is a network interface card. The communications unit 810 may provide communications through the use of either or both physical and wireless communications links.

The input/output unit 812 allows for input and output of data with other devices that may be connected to the data processing system 800. For example, the input/output unit 812 may provide a connection for user input through a keyboard, a mouse, and/or some other suitable input device. Further, the input/output unit 812 may send output to a printer. The display 814 provides a mechanism to display information to a user.

Instructions for the operating system, applications, and/or programs may be located in the storage devices 816, which are in communication with the processor unit 804 through the communications framework 802. In these illustrative examples, the instructions are in a functional form on the persistent storage 808. These instructions may be loaded into the memory 806 for execution by the processor unit 804. The processes of the different embodiments may be performed by the processor unit 804 using computer-implemented instructions, which may be located in a memory, such as the memory 806.

These instructions are referred to as program code, computer usable program code, or computer readable program code that may be read and executed by a processor in the processor unit 804. The program code in the different embodiments may be embodied on different physical or computer readable storage media, such as the memory 806 or the persistent storage 808.

Program code 818 is located in a functional form on computer readable media 820 that is selectively removable and may be loaded onto or transferred to the data processing system 800 for execution by the processor unit 804. The program code 818 and the computer readable media 820 form a computer program product 822 in these examples. In one example, the computer readable media 820 may be computer readable storage media 824 or computer readable signal media 826.

The computer readable storage media 824 may include, for example, an optical or magnetic disk that is inserted or placed into a drive or other device that is part of the persistent storage 808 for transfer onto a storage device, such as a hard drive, that is part of the persistent storage 808. The computer readable storage media 824 also may take the form of a persistent storage, such as a hard drive, a thumb drive, or a flash memory, that is connected to the data processing system 800. In some instances, the computer readable storage media 824 may not be removable from the data processing system 800.

In these examples, the computer readable storage media 824 is a physical or tangible storage device used to store the program code 818 rather than a medium that propagates or transmits the program code 818. The computer readable storage media 824 is also referred to as a computer readable tangible storage device or a computer readable physical storage device. In other words, the computer readable storage media 824 is a media that can be touched by a person.

Alternatively, the program code 818 may be transferred to the data processing system 800 using the computer readable signal media 826. The computer readable signal media 826 may be, for example, a propagated data signal containing the program code 818. For example, the computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, the program code 818 may be downloaded over a network to the persistent storage 808 from another device or data processing system through the computer readable signal media 826 for use within the data processing system 800. For instance, program code stored in a computer readable storage medium in a server data processing system may be downloaded over a network from the server to the data processing system 800. The data processing system providing the program code 818 may be a server computer, a client computer, or some other device capable of storing and transmitting the program code 818.

The different components illustrated for the data processing system 800 are not meant to provide architectural limitations to the manner in which different embodiments may be implemented. The different advantageous embodiments may be implemented in a data processing system including components in addition to or in place of those illustrated for the data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 804 may take the form of a hardware unit that has circuits that are manufactured or configured for a particular use. This type of hardware may perform operations without needing program code to be loaded into a memory from a storage device to be configured to perform the operations.

For example, when the processor unit 804 takes the form of a hardware unit, the processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, the program code 818 may be omitted, because the processes for the different embodiments are implemented in a hardware unit.

In still another illustrative example, the processor unit 804 may be implemented using a combination of processors found in computers and hardware units. The processor unit 804 may have a number of hardware units and a number of processors that are configured to run the program code 818. With this depicted example, some of the processes may be implemented in the number of hardware units, while other processes may be implemented in the number of processors.

In another example, a bus system may be used to implement the communications framework 802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, the memory 806, or a cache, such as found in an interface and memory controller hub that may be present in the communications framework 802.

Thus, the different advantageous embodiments provide a method and apparatus for managing an antenna. In particular, the different advantageous embodiments provide a method and apparatus for managing the side lobe levels of a radiation pattern for an antenna when one or more antenna elements in the antenna operate outside of selected parameters.

In one advantageous embodiment, a method for managing an antenna is provided. A current radiation pattern is identified for the antenna using initial coefficients for a modulation function for the antenna. A first constraint is applied to the current radiation pattern to form a modified radiation pattern. New coefficients for the modulation function are identified as coefficients for which a difference between a radiation pattern for the antenna generated using the coefficients and the modified radiation pattern is reduced. A second constraint is applied to a set of coefficients in the new coefficients to form modified coefficients for the modulation function. The steps of applying the first constraint, identifying the new coefficients for the modulation function, and applying the second constraint are iterated until a new radiation pattern based on the modified coefficients for the modulation function meets the first constraint.

Further, the steps of applying the first constraint to the current radiation pattern to form the modified radiation pattern, identifying the new coefficients for the modulation function using the modified radiation pattern, and applying the second constraint to the set of coefficients in the new coefficients for the modulation function to remove the contribution of the set of elements in the array of elements operating outside of the selected parameters to the modified radiation pattern to form the modified coefficients for the modulation function are iterated until a new radiation pattern based on the modified coefficients for the modulation function meets the first constraint.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a radiation pattern generated by an antenna, the method comprising:
   using a computer system having a processor to perform the steps of:
   identifying a current radiation pattern for the antenna using initial coefficients for a modulation function for the antenna;
   (a) applying a first constraint to the current radiation pattern to form a modified radiation pattern;
   (b) identifying new coefficients for the modulation function as trial coefficients for which a difference between a radiation pattern for the antenna generated using the coefficients trial and the modified radiation pattern is reduced;
   (c) applying a third constraint to the new coefficients such that the new coefficients have a selected number of coefficients equal to a number of elements in an array of elements in the antenna;
   (d) substantially removing a contribution to the modified radiation pattern of a set of elements in the array of elements that are operating outside of selected parameters by applying a second constraint to a set of coefficients in the new coefficients that correspond to the set of elements to form modified coefficients for the modulation function;
   iterating through the steps of (a), (b), (c), and (d) until a new radiation pattern based on the modified coefficients for the modulation function meets the first constraint; and
   in response to the new radiation pattern meeting the first constraint, operating the antenna using the modulation function with the modified coefficients such that a performance of the antenna is within selected tolerances.

2. The method of claim 1 further comprising:
   identifying, by the computer system, the new radiation pattern for the antenna using the modified coefficients.

3. The method of claim 1, wherein applying the first constraint to the current radiation pattern to form the modified radiation pattern comprises:
   applying, by the computer system, the first constraint to the current radiation pattern to form the modified radiation pattern such that side lobe levels for side lobes of the current radiation pattern that are greater than a selected threshold are set to the selected threshold in the modified radiation pattern.

4. The method of claim 1, wherein applying the second constraint to the set of coefficients in the new coefficients comprises:

setting, by the computer system, the set of coefficients in the new coefficients corresponding to the set of elements in the array of elements in the antenna to substantially zero.

5. The method of claim 1, wherein identifying the new coefficients comprises:
identifying, by the computer system, the new coefficients for the modulation function as the trial coefficients for which a sum of differences between first values for the radiation pattern generated using the trial coefficients at a plurality of angular directions with respect to the antenna and second values for the modified radiation pattern at the plurality of angular directions is reduced to a minimum value for the sum of the differences.

6. The method of claim 1, wherein identifying the new coefficients comprises:
identifying, by the computer system, trial the coefficients for the modulation function in which the trial coefficients have a same number as the selected number of coefficients; and
iterating, by the computer system, through the step of identifying the trial coefficients using a least squares algorithm until the radiation pattern for the antenna generated using the trial coefficients and the modified radiation pattern is reduced to a minimum.

7. The method of claim 6, wherein the radiation pattern of the antenna is a product of a matrix and the modulation function in the form of a vector, wherein the matrix identifies contributions of each of a set of elements in the array of elements in the antenna to the radiation pattern for a selected number of samples of the radiation pattern.

8. The method of claim 7, wherein identifying the trial coefficients for the modulation function in which the trial coefficients have the same number as the selected number of coefficients comprises:
identifying, by the computer system, the trial coefficients for the modulation function using a first product of a transpose of a complex conjugate of the matrix and the modified radiation pattern divided by a second product of the transpose of the complex conjugate of the matrix and the matrix.

9. The method of claim 6, wherein the least squares algorithm is a minimum-norm least squares algorithm.

10. An apparatus for controlling a radiation pattern generated by an antenna, the apparatus comprising:
an antenna manager configured to:
identify a current radiation pattern for the antenna using initial coefficients for a modulation function for the antenna;
(a) apply a first constraint to the current radiation pattern to form a modified radiation pattern;
(b) identify new coefficients for the modulation function as trial coefficients for which a difference between a radiation pattern for the antenna generated using the coefficients trial and the modified radiation pattern is reduced;
(c) apply a third constraint to the new coefficients such that the new coefficients have a selected number of coefficients equal to a number of elements in an array of elements in the antenna;
(d) substantially removing a contribution to the modified radiation pattern of a set of elements in the array of elements that are operating outside of selected parameters by applying a second constraint to a set of coefficients in the new coefficients that correspond to the set of elements to form modified coefficients for the modulation function; and
iterate through the steps of (a), (b), (c), and (d) until a new radiation pattern based on the modified coefficients for the modulation function meets the first constraint, and in response to the new radiation pattern meeting the first constraint, operating the antenna using the modulation function with the modified coefficients such that the performance of the antenna is within selected tolerances.

11. The apparatus of claim 10, wherein the antenna manager is further configured to identify the new radiation pattern for the antenna using the modified coefficients.

12. The apparatus of claim 10 further comprising:
the antenna comprising an array of elements in the antenna.

13. The apparatus of claim 10, wherein the first constraint includes a selected threshold for side lobe levels for side lobes of the current radiation pattern.

14. The apparatus of claim 10, wherein the antenna manager is configured to apply the second constraint by setting the set of coefficients in the new coefficients corresponding to the set of elements in the array of elements in the antenna to substantially zero.

15. The apparatus of claim 14, wherein the antenna manager is configured to identify the new coefficients by identifying trial the coefficients for the modulation function in which the trial coefficients have a same number of elements in the array of elements in the antenna and iterate through the step of identifying the trial coefficients using a least squares algorithm until the radiation pattern for the antenna generated using the trial coefficients and the modified radiation pattern is reduced to a minimum.

16. The apparatus of claim 15, wherein the least squares algorithm is a minimum-norm least squares algorithm.

17. A computer system for controlling a radiation pattern generated by an antenna comprising:
a bus system;
a storage device connected to the bus system, wherein the storage device is configured to store program code; and
a processor unit, wherein the processor unit is configured to run the program code to:
identify a current radiation pattern for the antenna using initial coefficients for a modulation function for the antenna;
(a) apply a first constraint to the current radiation pattern to form a modified radiation pattern;
(b) identify new coefficients for the modulation function as trial coefficients for which a difference between a radiation pattern for the antenna generated using the coefficients trial and the modified radiation pattern is reduced;
(c) applying a third constraint to the new coefficients such that the new coefficients have a selected number of coefficients equal to a number of elements in an array of elements in the antenna;
(d) substantially remove a contribution to the modified radiation pattern of a set of elements in the array of elements that are operating outside of selected parameters by applying a second constraint to a set of coefficients in the new coefficients that correspond to the set of elements to form modified coefficients for the modulation function; and
iterate through the steps of (a), (b), (c), and (d) until a new radiation pattern based on the modified coefficients for the modulation function meets the first constraint, and in response to the new radiation pattern meeting the first constraint, operating the antenna using the modulation function with the modified coefficients such that the performance of the antenna is within selected tolerances.

18. The method of claim 1, further comprising:

identifying the set of elements in the array of elements in the antenna that are operating outside of the selected parameters;

wherein the set of elements in the array of elements in the antenna operating outside of selected parameters have failed.

19. The computer system of claim 17, wherein the processor unit configured to run the program code to identify the new coefficients further comprises:

the processor unit configured to run the program code to identify the new coefficients for the modulation function as the trial coefficients for which a sum of differences between first values for the radiation pattern generated using the trial coefficients at a plurality of angular directions with respect to the antenna and second values for the modified radiation pattern at the plurality of angular directions is reduced to a minimum value for the sum of the differences.

\* \* \* \* \*

UNITED STATES PATENT AND TRADEMARK OFFICE
CERTIFICATE OF CORRECTION

PATENT NO. : 9,780,446 B1
APPLICATION NO. : 13/279602
DATED : October 3, 2017
INVENTOR(S) : Yu Page 1 of 1

It is certified that error appears in the above-identified patent and that said Letters Patent is hereby corrected as shown below:

In the Claims

Column 16, Line 29, Claim 1 change "the coefficients trial" to -- the trial coefficients --
Column 17, Line 5, Claim 5 change "the coefficients trial" to -- the trial coefficients --
Column 17, Line 17, Claim 6 change "trial the coefficients" to -- the trial coefficients --
Column 18, Line 25, Claim 15 change "trial the coefficients" to -- the trial coefficients --
Column 18, Line 49, Claim 17 change "the coefficients trial" to -- the trial coefficients --

Signed and Sealed this
Sixth Day of November, 2018

Andrei Iancu
*Director of the United States Patent and Trademark Office*